(12) United States Patent
Prendki et al.

(10) Patent No.: US 10,635,697 B1
(45) Date of Patent: Apr. 28, 2020

(54) AUTOMATIC SUGGESTIONS BASED ON GROUP RELEVANCE

(71) Applicant: ATLASSIAN PTY LTD, Sydney (AU)

(72) Inventors: Jennifer Prendki, Mountain View, CA (US); Yanyi He, Sunnyvale, CA (US)

(73) Assignee: Atlassian Pty Ltd, Sydney (AU)

( * ) Notice: Subject to any disclaimer, the term of this patent is extended or adjusted under 35 U.S.C. 154(b) by 0 days.

(21) Appl. No.: 16/105,817

(22) Filed: Aug. 20, 2018

Related U.S. Application Data (60) Provisional application No. 62/650,686, filed on Mar. 30, 2018.

(51) Int. Cl.
*G06F 16/00* (2019.01)
*G06F 7/00* (2006.01)
*G06F 16/332* (2019.01)

(52) U.S. Cl.
CPC .............................. *G06F 16/3322* (2019.01)

(58) Field of Classification Search
CPC ............. G06F 17/3097; G06F 17/3064; G06F 17/30598
USPC ......................................................... 707/767
See application file for complete search history.

(56) References Cited

U.S. PATENT DOCUMENTS

| | | | |
|---|---|---|---|
| 6,564,213 B1* | 5/2003 | Ortega | G06F 16/3322 |
| 2016/0239581 A1* | 8/2016 | Jaidka | G06F 16/345 |
| 2017/0344541 A1* | 11/2017 | Haeusler | H04L 67/42 |
| 2018/0075147 A1* | 3/2018 | Bagheri | G06Q 30/0269 |
| 2018/0114177 A1* | 4/2018 | Somech | G06Q 10/063118 |
| 2018/0137135 A1* | 5/2018 | Walton | G06F 16/35 |

* cited by examiner

*Primary Examiner* — Usmaan Saeed
*Assistant Examiner* — Raquel Perez-Arroyo
(74) *Attorney, Agent, or Firm* — Hickman Palermo Becker Bingham LLP (57) ABSTRACT

Techniques are presented herein for improved automatic suggestions based on group relevance. The techniques include determining groups of account based on the interactions of those accounts with content items, e.g., on a federated system, and ranking tokens extracted from those content items based at least in part on one or more factors. When a partial input is received from a particular account, tokens are ranked based on groups associated with the account and are presented in the user interface.

20 Claims, 4 Drawing Sheets

AUTOMATIC SUGGESTIONS BASED ON GROUP RELEVANCE

BENEFIT CLAIM

This application claims the benefit under 35 U.S.C. § 119(e) of provisional application 62/650,686, filed Mar. 30, 2018, the entire contents of which is hereby incorporated by reference for all purposes as if fully set forth herein.

FIELD OF THE INVENTION

The techniques described herein relate to automatically suggesting text as a user types, and in particular to improved automatic suggestions based on group relevance.

BACKGROUND

Automatic suggestion of words as a user types is a useful feature of some computer systems. Previously, users were required to type in ever letter of every phrase needed to search, type in a document, fill out a meeting request, etc. Now, some search engines, for example, will suggest search terms as you type. This allows the user to avoid typing in an entire search term or phrase, and instead select the search term or phrase. An issue with these systems, however, is that these suggested terms are not suggested based on the relevance to the user typing. As such, terms suggested may be of little relevance to the user typing, and, as such, the user is given irrelevant information and, possibly, not presented with the words or phrases that are intended.

The techniques described herein address these issues.

The approaches described in this section are approaches that could be pursued, but are not necessarily approaches that have been previously conceived or pursued. Therefore, unless otherwise indicated, it should not be assumed that any of the approaches described in this section qualify as prior art merely by virtue of their inclusion in this section.

SUMMARY

The attached claims serve as a summary of the invention.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

GENERAL OVERVIEW

As discussed above, one of the most useful features of computing systems is automatically suggesting content as a user types. For example, if a user types in "B", the computer system may suggest "Bloomingdale's", "Basketball", and "Bumblebee". If the user is attempting to type one of the suggested words, this can really improve efficiency in typing. The user can interactively accept automatically suggested words or other tokens (e.g., using a mouse and/or the Tab key). An issue with such autosuggest systems is, however, that the suggestions are not directed to what may be useful to the user. Therefore, the user may be typing the beginning of a word, such as "Cro" and get back "CrossFit", "Crocs" and "Crossword" when the user was intending to type in the name of a project that she is working on "Cronos". The computer system making these suggestions may be making them based on, for example, what other users across the system might have typed in. The average relevance across an entire ecosystem of users may not, however, be a good measure of what to suggest to a particular user.

In some embodiments, techniques herein determine and suggest tokens that are relevant to groups with which the user is associated in order better predict what the user may be typing. Various embodiments of determining the groups is discussed more below.

Generally, the techniques include receiving a partial input as a user types in a word (e.g., in a search or other text box), determining relevant groups for the particular account node associated with the input (e.g., an account node may be a representation of a user account), and determining tokens to show on the display as the user types, based at least in part on tokens that are relevant to other accounts in the account node groups with which the particular user account is associated.

In some embodiments, techniques herein use the actions taken by multiple user accounts on digital content in order to determine groupings of those accounts. In the discussion herein, accounts are discussed as represented by "white" nodes, content on which accounts take action are "black" nodes, and the edges between the white nodes and black nodes are the actions taken by the white nodes on the black nodes (e.g., an account (white node) may edit (edge connector) a document (black node). The actions taken by white nodes on black nodes can be partitioned using a technique such as the Louvain Modularity or other partitioning technique. Node groups can be created based on a partitioning. The digital content maybe, for example, digital content associated with federated programs running on computing systems and being used by a number of accounts, such as accounts related to work. The account node groups that are determined based on the partitioning may later be used to improve the relevance of suggested tokens, by looking at what the other accounts in associated groups of accounts have interacted with in the system. Numerous embodiments are described herein and provide many benefits, including the benefit of providing improved suggestions when the account is associated with a group of other accounts.

In some embodiments, when an individual account begins to type a word or phrase, the autosuggest system using the techniques herein will receive partial input. From there, it will use the previously determined account node groups to determine one or more corresponding account node groups which are related to the particular account (the one from which partial input has been received). Based on these particular account node groups, the autosuggest system will use the account node groups to determine digital tokens that have been typed in, or edited by, accessed by, et cetera, other accounts in those account node groups. These may have been previously ranked by the group relevance system. The tokens for the account node groups will then be searched by the autosuggest system based on the partial input. In this way the tokes for the account node group(s)'s accounts will be increased in weighting relevance in the autosuggest results. Increasing the relevance in the autosuggest results of the tokens should improve the relevance of the autosuggest results for the particular account that is associated with the partial input. These autosuggest results are then provided for display. Optionally, in some embodiments, a selection of an automatically suggested result may be received, and the use of the selected token may be caused (e.g., the selected "Cronos" may be input into the field).

Consider an example where Alicia, Bob and Carole all work together on a project. The three of them may not be in the same organization within the org chart of the company. Bob and Carole may have each searched for or typed in "Cronos" often, as well as used conference room "17-4 Scroll Saw" often. So, when Alicia begins typing in the term "Cro . . . ", the autosuggest system may determine that Alicia is in a group with Bob and Carole (from account node groups made based on the account node partitioning or made in some other way). From there, it can determine suggestions for the "Cro" partial input, such as "Cronos" and "17-4 Scroll Saw". As may be clear from the example, when typing in a partial word that could have many possible completions, Alicia may otherwise (if not for the techniques herein) may not have been given the appropriate tokens "Cronos" or", "17-4 Scroll Saw" at all, and even if she were, it might be buried in a long list of suggestions. Further to this example, Alicia might be part of other groups, each of those may or may not have a token containing "Cro" that is relevant to others in those group. If there are other groups that have relevant tokens containing "cro" then those documents may also be served in Alicia's suggestions. In this way, Alicia is served the most relevant suggestions containing the letters "cro".

In addition to working with the partitioned groups discussed herein, the techniques also work with groupings such as location of users associated with account nodes, organization of account nodes based on corporate organizational structures, and the like.

Example Processes for Improved Automatic Suggestions Based on Group Relevance

Figure 1:
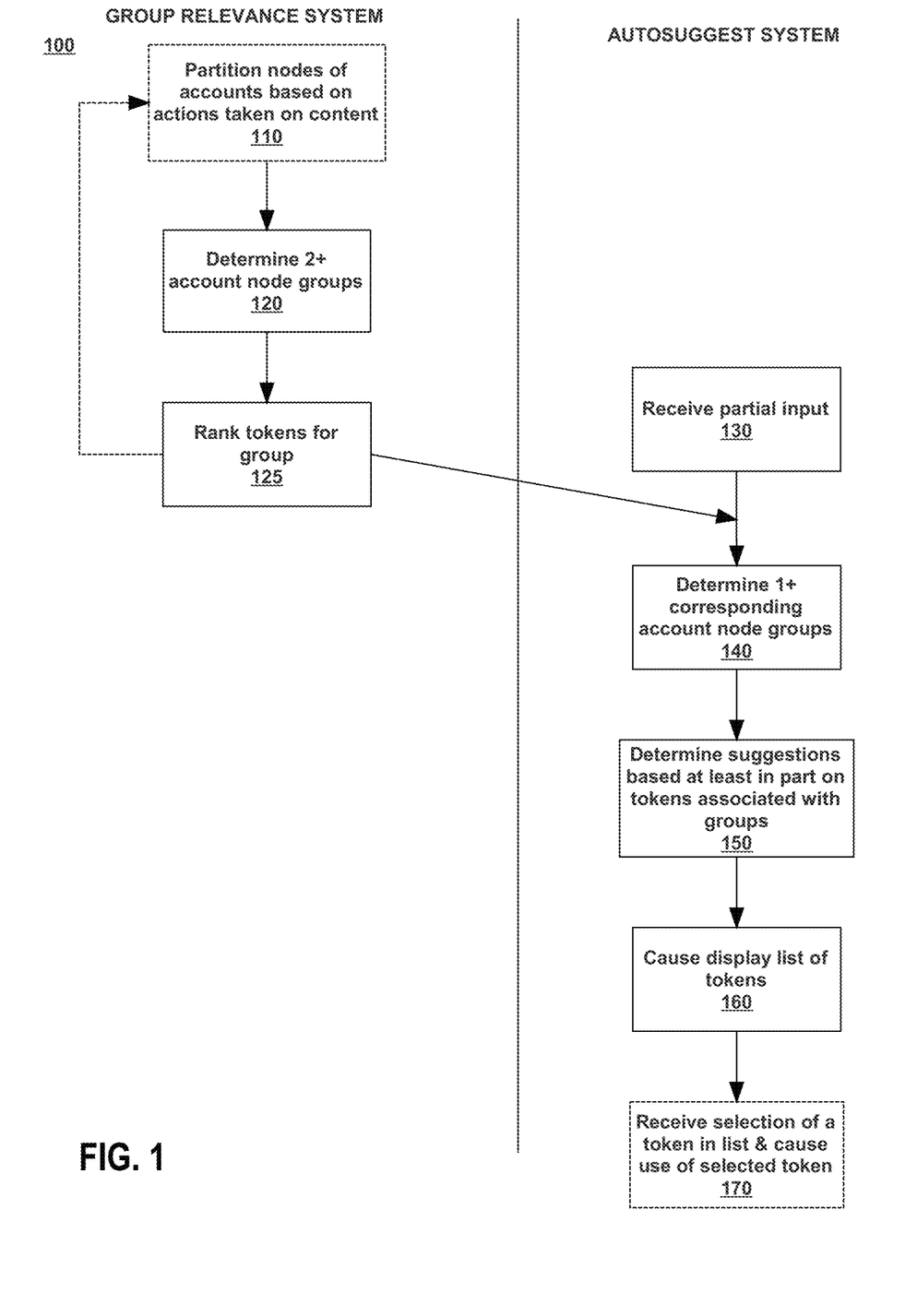
FIG. 1 depicts an example process for improved automatic suggestions based on group relevance.

FIG. 1 depicts an example process 100 for improved automatic suggestions based on group relevance. Process 100 optionally commences by partitioning 110 account nodes based on actions taken by those nodes (e.g. representing user accounts on a federated system) on content nodes (e.g., representing documents, chat rooms, etc.). Partitioning 110 those account nodes can include the use of any appropriate partition algorithm, including those discussed herein. The group relevance system will determine 120 two or more account node groups. If partitioning 110 was performed, then the groups will be determined based on the partitioning 110. Otherwise, the groups may be determined 120 based on other factors, such as grouping based on organizational structure, project team lists, location, etc. Generally, during partitioning, accounts associated with nodes in each of the two or more groups will have interacted with similar digital content. The interactions maybe searching on a particular term, clicking on a document in search results, lingering on a document for a period of time, going into a particular chat room, contributing in a chat room, responding to a message in a chat room, editing a document, commenting on a document, responding to a comment on a document, and the like.

Process 100 proceeds by the group relevance system ranking 125 one or more tokens associated with the groups. The term token, as used herein, is a broad term encompassing its plain and ordinary meaning, including one or more words or phrases, and can include words in any language, and names, email address, room names, etc. For example, the terms searched for previously by members of the groups may be broken up word-by-word into tokens and/or broken up into phrases; room names added to calendar invites may be used as tokens; etc. The terms can be ranked using any appropriate method, including frequency of use, a weighted calculation based on the type of token and/or use (e.g., names associated with accounts and email addresses added to emails or calendar invites may be given more weight).

In some embodiments, not depicted in FIG. 1, the autosuggest system ranks 125 the tokens for the groups after the groups have been sent to the autosuggest system.

As noted by the dotted line between ranking 125 and partitioning 110, the node groups may be updated, and tokens ranked periodically (e.g., every 10 minutes, 10 hours, day, week, etc.), and partitioning 110 and determining 120 may therefore be repeated in each cycle.

Figure 4:
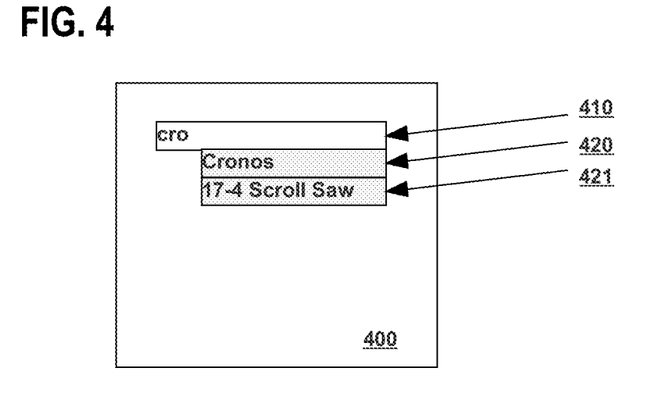
FIG. 4 and FIG. 5 depict example user interfaces for improved automatic suggestions based on group relevance.
Figure 5:
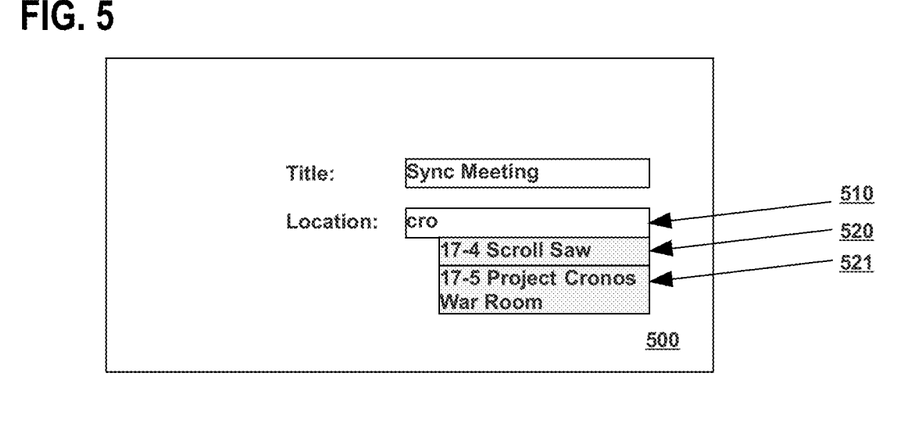

The determined 120 account node groups and rankings may be sent to the autosuggest system. The autosuggest system receives 130 a partial input from an account associated with an account node. The autosuggest system will determine 140 one or more corresponding account node groups for the account from which the partial input was received 130. The suggestions are then determined 150 by the autosuggest system based at least in part on the ranked tokens and the partial input. After determining 150 the suggestions for the partial input, display 160 of the suggestions is caused. In some embodiments, the suggestions are provided in a manner such as those depicted in user interfaces 400 and/or 500.

In some embodiments, process 100 also includes receiving 170 a selection (e.g., on a user interface such one or user interfaces 400 or 500) from among the suggestions. Such a selection may be followed by the token being used. For example, if process 100 has as input the partial input "cro", and suggests "Cronos", "17-4 Scroll Saw" and "Project Cronos" as the suggested tokens, and the user interface is used to select "Project Cronos" as the token, then this token may be used in the input mechanism on the interface. Examples such as this are discussed more below.

Returning to the top of process 100, actions taken by account nodes on content are optionally partitioned 110. Partitioning 110 can be performed using any appropriate method including Louvain Modularity or the Louvain Method for Community Detection. Using the Louvain Method, small communities are found by optimizing modularity locally on all the nodes. Then each small community is grouped into one node and the first step is repeated. Another approach is that of Clauset, Newman, and Moore and more that finds community structure in very large networks. Further, K-means clustering may be used, which will partition the data space into Voronoi cells, which can be used to determine groups.

If the account nodes have been partitioned 110, the account node groups are determined 120 based on the partitioning 110. The account node groups can be of any size. For example, a group may have just two account nodes therein, or may have tens or hundreds of account nodes. A particular account can be associated with multiple account node groups, or a single account node group. For example, a particular user named Alicia is working on Project Cronos and two other projects. For her work on Project Cronos, she also works with Bob and Carole. Alicia, Bob, and Carole all work on particular documents and in particular chat rooms for Project Cronos. Based on the interactions that all three of them have made related to Project Cronos with particular digital content, they will be partitioned together, and an account node group will be formed based on those three. This happens regardless of whether Alicia, Bob, and Carole are all in the same corporate organization, location, etc. Similar assessment will be made, and groups formed for the other projects on which Alicia works.

In some embodiments, as discussed elsewhere, the actions taken by accounts on content can be termed "white nodes" (the account nodes) acting on "black nodes" (the digital content). Generally, there will be far more black nodes than white nodes. The actions taken are the "edges" between the white nodes and the black nodes. For example, if Bob searches for the word "overview," the white node is Bob, the edge is "searches for" and the black node is the word "overview." When Bob gets back search results and clicks on the Overview document for Project Cronos, the white node is Bob, the edge is "clicks on" and the black node is the Project Cronos Overview Document. Bob may then edit the document, and the white node is Bob, the edge is the act of editing, and the black node is the Project Cronos Overview Document. Alicia and Carole may make similar actions to Bob's on the Project Cronos Overview Document. They will have corresponding white nodes and black nodes and edges. Taken together, all of these white node edge black node combinations are used to partition 110 the actions taken by accounts on content. Based on the similarity and overlap of these interactions, the determination 120 can be made to place Alicia, Bob and Carol in the same group.

In some embodiments, the account node groups are determined 120 based on additional or different factors. For example, in some embodiments, the account nodes are determined 120 based on one or more of organizational structure, location, manager, etc. The account node groups would then be based on those factors. For example, an account node group may be formed based on accounts of people who report to the same manager and/or are in the same location. In some embodiments, no partitioning is done, and the account node groups are formed based on an input, such as based on one or more lists of user accounts (e.g., listing project teams) corresponding to account nodes.

The group relevance system ranks 125 tokens for the determined groups of nodes. As discussed elsewhere herein, tokens can take many forms, including words or phrases used in documents, words or phrases used in calendar invites, words or phrases used in chats or other messaging programs, user account names and email addresses, etc. Returning to the conceptualization of account nodes being white nodes and content items being black nodes, tokens can be extracted or determined for black nodes (content items). For example, a black node that is an email may have a token associated with it for the "to:" field of the email, for the "from:" field of the email, and for the "cc:" field of the email, further, as discussed more below, the tokens can include metadata indicating what part of the email the token came from. Tokens may also be created for the subject line, with one or more tokens representing phrases in the subject line and/or words in the subject line. Similarly, the body of the email may be broken up into tokens (e.g., word by word, and/or with phrases).

Calendar invites can also be associated with numerous tokens. The title and message body of the calendar invite may be tokenized in a way similar to an email address or a document. The location of the meeting may also be tokenized. For example, the name of the conference room in which the meeting is taking place may be its own token. Any building names may also be their own tokens. Similarly, if a street address or other location is used it may also be broken up into tokens (e.g., with each of street address, city, state, zip each being tokenized into one or more tokens).

As alluded to, documents (e.g., word processor or text documents) can also be broken up into tokens. The file name of the document may be broken up into one or more tokens. The body of the document may also be tokenized. Any headers may have their own separate tokens along with metadata in the token that indicates that it is a header. The body of the document may also be tokenized.

In addition to the metadata discussed above, in some embodiments, tokens may have frequency information attached. That is, it may have metadata indicating the number of times that token appeared in the content item (or section of the content item). For example, if the word Cronos appears 65 times in the body of an email, the token may indicate both the word Cronos and that it appeared 65 times in the email body.

In some embodiments, as discussed above, tokens may have various metadata attached. For example, as noted above, the frequency of a token in a particular content item may be indicated in metadata in the token. The type of data that is in the token, or the area from which the token was taken may also be indicated in the metadata. For example, an email address may have metadata indicating that it is an email address, as well as whether it was in the "to:", "cc:", or "from:" fields. Timing information may also be included in tokens. For example, if an email address was sent on Mar. 10, 2018, then tokens associated with that email may have an indication of that date. The area from which the token was taken may also be indicated in metadata in the token. For example, tokens taken from the document title may have an identifier indicating that the token was taken from the document title. Similarly, tokens taken from file names may have an indication that the token is related to a file name. Tokens taken from the message body may have an indication indicating that the token is related to the message body.

In some embodiments, relevance of each token is determined for each account node, and the relevance for each groups of nodes may be determined based on the combination of the relevance of the tokens to the account nodes in the group. For example, returning to the conceptualization of the white nodes and black nodes, for a particular token related to black nodes (content items), the more often it is interacted with by a particular white node (account), the higher ranked the token should be for the partial input. If a different white node (account) that is in the same account node group also interacted with the same particular token, then that interaction would also increase the rank of the token for the partial input. Stated another way, the autosuggest system may rank tokens at least in part on the frequency of interaction of white nodes with black nodes containing or related to the tokens and/or the frequency of occurrence of those tokens in the content items for the black nodes. For example, if Bob and Carole are in a node group with Alicia, and if Bob has edited numerous documents with the token "Cronos" in the document text and/or title, used the term "Cronos" in the subject of emails and/or calendar invites, etc., then the token "Cronos" may be highly ranked for the account node related to Bob. Similarly, if Carole has viewed, edited, etc. documents with frequent occurrence of "Cronos", the token "Cronos" would be ranked yet higher based on the combination of the rankings of Bob and Carole.

Ranking tokens may be done in any appropriate manner. For example, tokens that represent common words or phrases may be excluded from the ranking completely. This may happen even if they occur frequently in the associated black nodes. For example, common words such as "the," "a," "you," etc. may be excluded from ranking. In some embodiments, the group relevance system may look at tokens that are common across many white nodes, or account nodes, and exclude those that occur frequently in most or all of the white nodes. For example, if users in a large federated system often use words such as "the," "a," "you," etc. then those may be excluded from the ranked tokens. In some embodiments, however, frequent occurrence of phrases across accounts in a federated system may indicate that the word or phrase should be included in the suggested tokens. For example, if many white nodes have used black nodes that contain the token "Atlassian," that may be an indication that future input may also be the word "Atlassian." As such, in some embodiments, those tokens may be a valid and useful automatic suggestion based on partial input and will not be excluded from the ranked tokens.

In some embodiments, a supervised machine learning method is used to determine the weighting of various factors on the relevance of tokens. For example, the metadata discussed above is attached to or included in each token may be used to train a supervised machine learning model. The training data for the supervised machine learning model will be tokens with the metadata and correct and/or incorrect token suggestions for particular partial input. Using this training data, a supervised machine learning model is trained to determine correct weightings to use for various metadata (fields and/or values) in suggesting a token. This supervised machine learning model can be used to determine, ranking 125 for tokens for account nodes (or groups of account nodes). The ranking can then be used by the autosuggest system to determine tokens to suggest based on partial input. In some embodiments, any appropriate type of supervised neural network or other machine learning method can be used for determining rankings such as a feedforward neural network, a radial basis function neural network, a Kohonen self-organizing neural network, a recurrent neural network, a convolutional neural network, a modular neural network, and/or the like. In some embodiments, a neural network is trained for all account nodes, but in other embodiments, a neural network could be trained separately for groups of account nodes and/or individual account nodes.

As noted above, in some embodiments, the rankings of tokens are performed for each account separately. The ranked tokens for each account node may then be combined to produce suggested items as a single list ranked based on the rankings for each account node. In some embodiments, when a token is suggested for more than one account node, the scores for each account node may be combined in any appropriate manner, such as using addition or averaging the two ranking scores. This list will then be used by the autosuggest system in order to determine 150 the tokens for account node groups, as discussed more below.

The autosuggest system receives 130 partial input for a particular account, associated with a particular account node. It will then determine 140 one or more corresponding account node groups for the particular account. Determining the one or more corresponding accounts node groups may comprise accessing the two or more account node groups that were determined 120 by the group relevance system. The account may be associated with only one account node group, or it may be associated with more than one account node group.

Process 100 proceeds with the autosuggest system determining 150 suggestions based at least in part on the ranking 125 of tokens for the determined 120 account node group(s). As discussed elsewhere herein, determining 150 the suggestions of tokens may be based at least in part on the ranking 125 of the tokens. The ranked 125 tokens may be searched in order to find tokens that match the partial input. For example, if the partial input is "cro", and the ranked tokens include "Cronos", "17-4 Scroll Saw" and "Project Cronos", then those tokens may be selected as the suggestions. In some embodiments, the partial input can be used to match any sequence of letters in the token (such as matching "cro" with "Cronos", "17-4 Scroll Saw" and "Project Cronos"). In some embodiments, the partial input may be matched only with tokens that begin with the same letters (e.g., just "Cronos", and not "17-4 Scroll Saw" and "Project Cronos").

In some embodiments, the tokens may be matched only with tokens of certain types. For example, as noted above, tokens may include metadata, and that metadata may include where the token was taken from and/or what type of data is included in the data. For example, "17-4 Scroll Saw" may have metadata indicating it is a location and a conference room. In these embodiments, the partial input received 130 may also include an indication of the type of input, and the type of input may be used to filter or weight the tokens. Returning to the same example, if the partial input is "cro" and the data type of the input is location or conference room (e.g., on a calendar invitation), then the tokens determined 150 to match the partial input may be limited to "17-4 Scroll Saw" in some embodiments because the token matches the data type of the input, or the token "17-4 Scroll Saw" may be ranked higher than "Cronos" and "Project Cronos" because "17-4 Scroll Saw" matches the data type of the input being suggested.

After the suggestions have been determined 150, the autosuggest system causes display 160 of the list of suggestions. Causing display 160 of the list of suggestions can include any appropriate mechanism, including sending the list of suggestions to a user device on which the partial input was typed. For example, is Alicia types "cro" into a text box for a location of a meeting on her user device, then causing display 160 of the suggestions may include providing to the user device the list of suggestions, and the user device displaying the list of suggestions on the user device (see, e.g., FIG. 4 and FIG. 5).

In some embodiments, process 100 optionally includes receiving 170 a selection of a token in the list of suggestions and causing use of the selected token. For example, if Alicia types "cro" into the text box for a location of a meeting, and the autosuggest system sends the list of suggestions, which include "17-4 Scroll Saw", then Alicia may select that token, and the token may then appear as if she had typed the entire token into the text box for location in the calendar invitation. Further, not depicted in FIG. 1, the selection of the token may be used to feed back into the supervised machine learning model (discussed elsewhere herein) in order to improve the supervised machine learning model. For example, in the example above, if Alicia dose not choose "17-4 Scroll Saw", but instead chooses (or types in) another token, "17-5 Cronos War Room", then that choice may be used along with other data to improve the supervised machine learning model used to rank 125 the tokens. In some embodiments, tokens are selectable using a mouse to navigate to the token, and selection may be indicated by the clicking of the mouse button. In some embodiments, selection is indicated by using arrow keys (to navigate among tokens) and/or a return key (to select a token) on a keyboard.

As discussed herein, various of the portions of process 100 may be executed on the group relevance system and/or the autosuggest system. The distribution of execution on each system is used merely one set of embodiments. Other sets of embodiments, even if performing the same or similar functions, may have a different distribution work among systems. For example, not depicted in FIG. 1, some or all what occurs on the autosuggest system may occur on a user device. For example, in some embodiments, the groupings, rankings, and trained supervised machine learning model are all sent to a user device, and the determination of groups and suggestion of tokens may occur locally at the user device. In yet other embodiments, the autosuggest system runs as part of the user device.

Example User Interfaces and Underlying Technology for Improved Automatic Suggestions Based on Group Relevance FIG. 4 depicts a user interface 400 for improved automatic suggestions based on group relevance. User interface 400 includes a text input box 410. Text input box 410 may be any appropriate input mechanism, including a rendered markup language box in which a user associated with a user account can type in a search term. In some embodiments, user interface 400 also includes suggestions of tokens provided by process 100. The suggestions may include tokens (or text from tokens) 420, 421. In some embodiments, not depicted in FIG. 4, the user interface may also include explanations that summarize why these particular suggestions are being displayed. Explanations may, for example, explain that people you work with have viewed, edited, the document, have joined the listed chat room, etc. that is associated with the token. In some embodiments, if you hover over a suggested token, it will show the explanations and/or information on what accounts related to yours interacted with the document, or provide other information related to why the particular search result is being displayed.

FIG. 5 depicts a user interface 500 for improved automatic suggestions based on group relevance. User interface 500 includes a text input box 510. Text input box 510 may be similar to text input box 410 from user interface 400. As depicted in user interface 500, text input box 510 may be a location box (in this case for a calendar invitation). When a user types in a partial input of a location in input box 510, the suggestions determined by process 100 may be limited to tokens that have metadata indicating that they are locations, and displayed as suggestions 520, 521.

System for Improved Automatic Suggestions Based on Group Relevance

Figure 2:
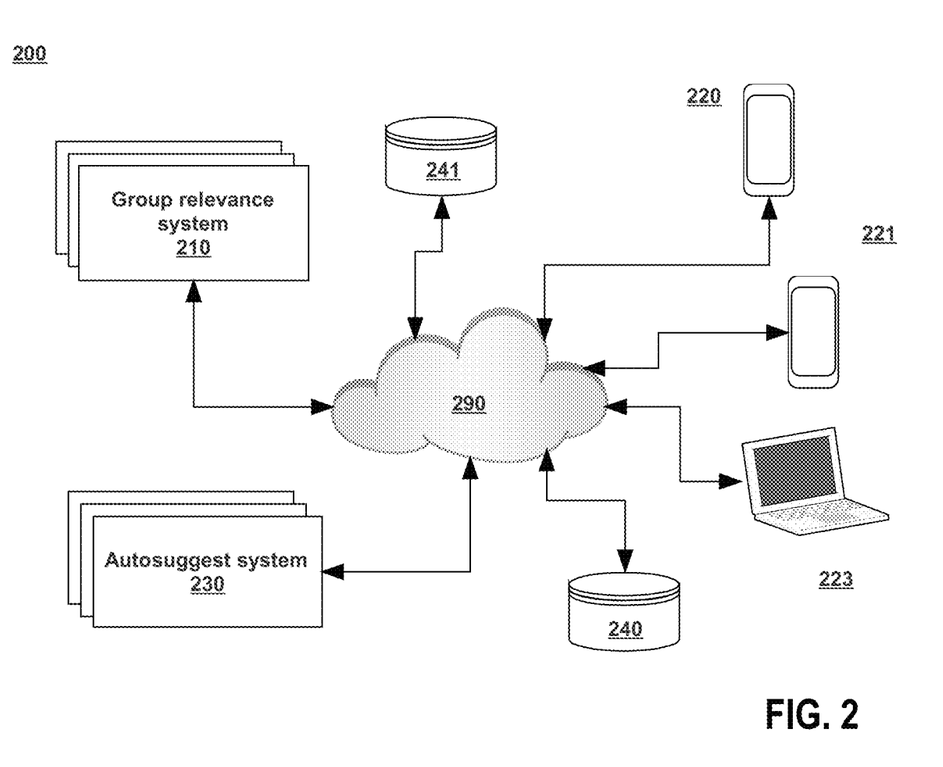
FIG. 2 depicts an example system for improved automatic suggestions based on group relevance.

FIG. 2 depicts an example system 200 for improved automatic suggestions based on group relevance. An autosuggest system 230, group relevance system 210, user devices 220, 221, 222 may all be coupled to a network 290 and be able to communicate via the network 290. Storage devices 240 and 241 are depicted as being coupled to the network 290, but they may also be coupled directly to group relevance system 210 and/or autosuggest system 230, respectively. Each storage device 240, 241 could also be coupled to network 290 or may be part of group relevance system 210 or autosuggest system 230. Each of the devices 220, 221, 222, autosuggest system 230, and group relevance system 210 may run as part of the same process and/or on the same hardware (not depicted in FIG. 2) or may run separately. Further, each may run on a single processor or computing device or on multiple computing devices, such as those discussed with respect to FIG. 3 and elsewhere herein.

As discussed elsewhere herein, the group relevance system 210 may be in communication with autosuggest system 230 and devices 220, 221, 222 in order to perform its portion of process 100. The group relevance system 210 may store the intermediary results and/or indications of groups of nodes in storage 241, or it may store these things in another location, such as in the autosuggest system 230 or storage 240. Autosuggest system 230 may store its search results in storage 240 or elsewhere. Suggestions determined using process 100 may be sent via network 290 to user devices 220, 221, 222. The device 220, 221, 222 may be used to display the user interfaces 400, 500 and may allow for the interactions from the user accounts discussed herein.

Group relevance system 210, and/or autosuggest system 230 or other servers (not pictured here) may run federated applications with which content items may relate. Federated application may include, but are not limited to, one or more of electronic mail servers or applications, chat servers or applications, other help ticket systems, video conferencing systems, resource control systems (e.g., a conference room booking system), blogging services, software code repositories, video content services (e.g., to show stored videos), and the like.

As discussed herein the process 100 may run in single or multiple instances, and run in parallel, in conjunction, together, or one process 100 may be a subprocess of another process 100. Further, any of the processes discussed herein, including process 100 may run on the systems or hardware discussed herein, including those depicted in FIG. 2 and FIG. 3.

Hardware Overview

According to some embodiments, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
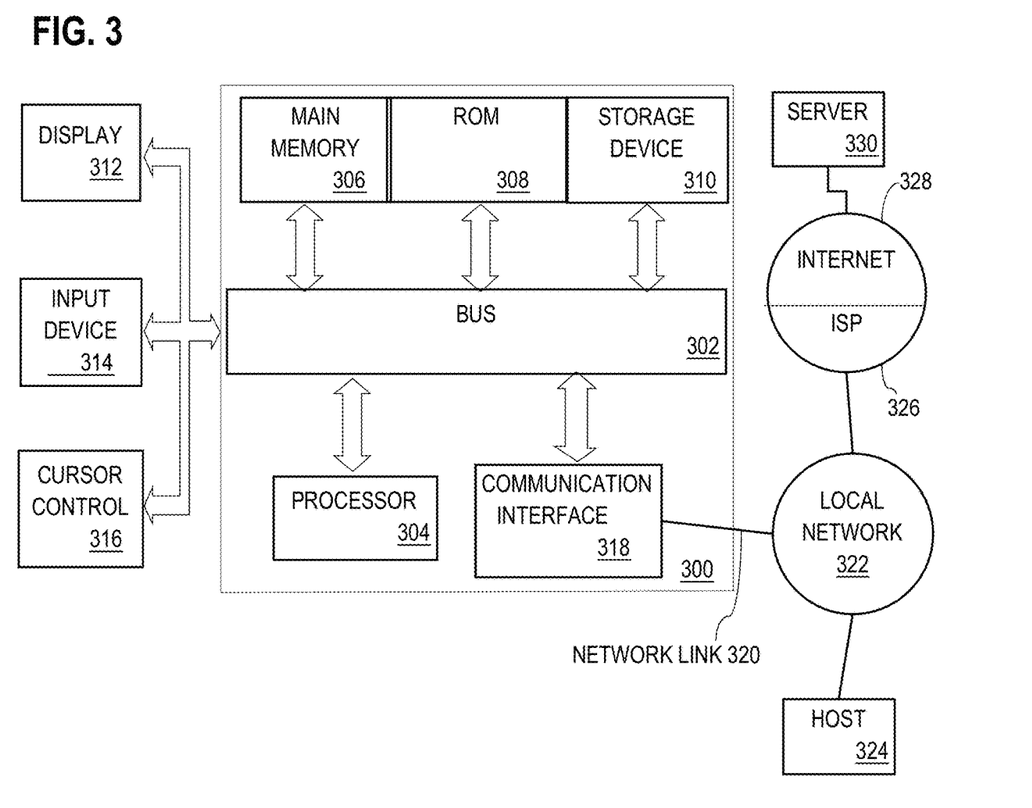
FIG. 3 depicts example hardware for improved automatic suggestions based on group relevance.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as an OLED, LED or cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane. The input device 314 may also have multiple input modalities, such as multiple 2-axes controllers, and/or input buttons or keyboard. This allows a user to input along more than two dimensions simultaneously and/or control the input of more than one type of action.

Computer system 300 may implement the techniques described herein using customized hard-wired logic, one or more ASICs or FPGAs, firmware and/or program logic which in combination with the computer system causes or programs computer system 300 to be a special-purpose machine. According to some embodiments, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information. Such a wireless link could be a Bluetooth, Bluetooth Low Energy (BLE), 802.11 WiFi connection, or the like.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A system, comprising:
one or more computing devices;
a group relevance system, executing using the one or more computing devices, the one or more computing devices being configured to execute group relevance system instructions, which, when execute cause the group relevance system to perform a first process of:
partitioning a plurality of account nodes into two or more node groups based on actions taken on same content items from a plurality of content items associated with a plurality of content nodes such that each of the two or more account node groups includes accounts associated with account nodes that have taken actions on a same particular content item from the plurality of content items associated with the plurality of content nodes;
determining two or more particular content items in the plurality of content items with which various account nodes in the two or more account node groups have interacted;
in response to the partitioning and the determining, extracting tokens from information contained within the two or more particular content items with which the various account nodes have interacted;
ranking the extracted tokens based at least in part on prevalence of the tokens in the two or more particular content items, wherein ranking the extracted tokens comprises ranking a token of the extracted tokens higher if the token appears in content items associated with more than one account node;
an autosuggest system, executing using the one or more computing devices, the one or more computing devices being configured to execute autosuggest system instructions, which, when execute cause the autosuggest system to perform a second process of:
receiving partial input associated with a particular user account, wherein the autosuggest system executes using the one or more computing devices and the particular user account has a corresponding particular user account node in the plurality of account nodes, and wherein the partial input was typed into a particular user interface;
determining one or more corresponding account node groups from the two or more account node groups associated with the particular user account node;
determining one or more suggested tokens based at least in part on the partial input and the ranked tokens for each of one or more corresponding account node groups;
causing display of the one or more suggested tokens in selectable form on the particular user interface;
receiving a selection of the selectable form of a token of the one or more suggested tokens;
causing use of the selected token in the particular user interface, wherein causing use of the selected token in the particular user interface comprises displaying text associated with the selected token in the particular user interface.

2. A method, comprising:
determining, using a group relevance system, two or more account node groups based at least in part on actions taken by a plurality of accounts, associated with a plurality of account nodes, on same content items from a plurality of content nodes, wherein the group relevance system executes using one or more computing devices and wherein each account node group of the two or more account node groups comprises two or more account nodes from the plurality of account nodes that have taken actions on a same particular content item from the plurality of content items associated with the plurality of content nodes;
determining two or more particular content items in the plurality of content items with which accounts associated with at least one of the two or more account node groups have interacted;
in response to the determining the two or more account node groups and to the determining the two or more particular content items, extracting tokens from information contained within the two or more particular content items;
ranking, using the group relevance system, the extracted tokens at least in part on one or more factors for the extracted tokens;
receiving, using an autosuggest system, partial input associated with a particular user account, wherein the autosuggest system executes using the one or more computing devices and the particular user account has a corresponding particular user account node in the plurality of account nodes, and wherein the partial input was typed into a particular user interface;
determining, using the autosuggest system, one or more corresponding account node groups from the two or more account node groups associated with the particular user account node;
determining, using the autosuggest system, one or more suggested tokens based at least in part on the partial input and the ranked tokens for each of one or more corresponding account node groups;
causing display, using the autosuggest system, of the one or more suggested tokens in the particular user interface,
wherein the method is executed on the one or more computing devices.

3. The method of claim 2, further comprising:
ranking the extracted tokens based at least in part on prevalence of the tokens in the two or more particular content items.

4. The method of claim 2, further comprising:
ranking a token of the extracted tokens higher if the token appears in content items associated with more than one account node.

5. The method of claim 2, further comprising:
ranking a token of the extracted tokens lower based at least in part on prevalence of the token in other sets of content items not associated with the one or more corresponding account node groups.

6. The method of claim 2, further comprising:
ranking a token of the extracted tokens based at least in part on a ratio of prevalence of the token in the two or more particular content items and prevalence of the token in other sets of content items not associated with the one or more corresponding account node groups.

7. The method of claim 2, further comprising:
causing display of the one or more suggested tokens in selectable form.

8. The method of claim 7, further comprising:
receiving a selection of the selectable form of a token of the one or more suggested tokens.

9. The method of claim 8, further comprising:
causing use of the selected token in the particular user interface.

10. The method of claim 9, wherein causing use of the selected token in the particular user interface comprises displaying text associated with the selected token in the particular user interface.

11. The method of claim 7, wherein causing display of the one or more suggested tokens in selectable form comprises causing display of the one or more suggested tokens in a selectable list.

12. The method of claim 2, wherein determining the two or more account node groups comprises:
partitioning the plurality of account nodes based on actions taken on the plurality of content items associated with the plurality of content nodes by accounts associated with the plurality of account nodes;
determining the two or more account node groups based at least in part on the partitioning of the plurality of account nodes.

13. The method of claim 12, wherein partitioning the plurality of account nodes comprises partitioning the plurality of account nodes using Louvain Modularity.

14. A system, comprising:
one or more computing devices;
a group relevance system, executing using the one or more computing devices, the one or more computing devices being configured to execute group relevance system instructions, which, when execute cause the group relevance system to perform a first process of:
determining two or more account node groups based at least in part on actions taken by a plurality of accounts, associated with a plurality of account nodes, on same content items from a plurality of content items, associated with a plurality of content nodes, wherein each account node group of the two or more account node groups comprises two or more account nodes from the plurality of account nodes that have taken actions on a same particular content item from the plurality of content items associated with the plurality of content nodes;
determining two or more particular content items in the plurality of content items with which accounts associated with at least one of the two or more corresponding account node groups have interacted;
in response to the determining the two or more account node groups and to the determining the two or more particular content items, extracting tokens from information contained within the two or more particular content items;
ranking the extracted tokens based at least in part on one or more factors for the extracted tokens;
an autosuggest system, executing using the one or more computing devices, the one or more computing devices being configured to execute autosuggest system instructions, which, when execute cause the autosuggest system to perform a second process of:
receiving partial input associated with a particular user account, wherein the autosuggest system executes using the one or more computing devices and the particular user account has a corresponding particular user account node in the plurality of account nodes, and wherein the partial input was typed into a particular user interface;
determining one or more corresponding account node groups from the two or more account node groups associated with the particular user account node;
determining one or more suggested tokens based at least in part on the partial input and the ranked tokens for each of one or more corresponding account node groups;
causing display of the one or more suggested tokens in the particular user interface.

15. The system of claim 14, the first process further comprising:
ranking the extracted tokens based at least in part on prevalence of the tokens in the two or more particular content items.

16. The system of claim 15, the first process further comprising:
ranking a token of the extracted tokens higher if the token appears in content items associated with more than one account node.

17. The system of claim 14, further comprising:
causing display of the one or more suggested tokens in selectable form;
receiving a selection of the selectable form of a token of the one or more suggested tokens;
causing use of the selected token in the particular user interface, wherein causing use of the selected token in the particular user interface comprises displaying text associated with the selected token in the particular user interface.

18. The system of claim 14, wherein determining the two or more account node groups comprises:
partitioning the plurality of account nodes based on actions taken on the plurality of content items associated with the plurality of content nodes by accounts associated with the plurality of account nodes;
determining the two or more account node groups based at least in part on the partitioning of the plurality of account nodes.

19. The system of claim 18, wherein partitioning the plurality of account nodes comprises partitioning the plurality of account nodes using Louvain Modularity.

20. The system of claim 14, wherein at least one of the two or more particular content items is associated with a federated program being used by the accounts associated with at least one of the two or more corresponding account node groups.

* * * * *